Nov. 9, 1948.  A. C. HUGIN  2,453,509
DYNAMOELECTRIC MACHINE
Filed Dec. 11, 1945
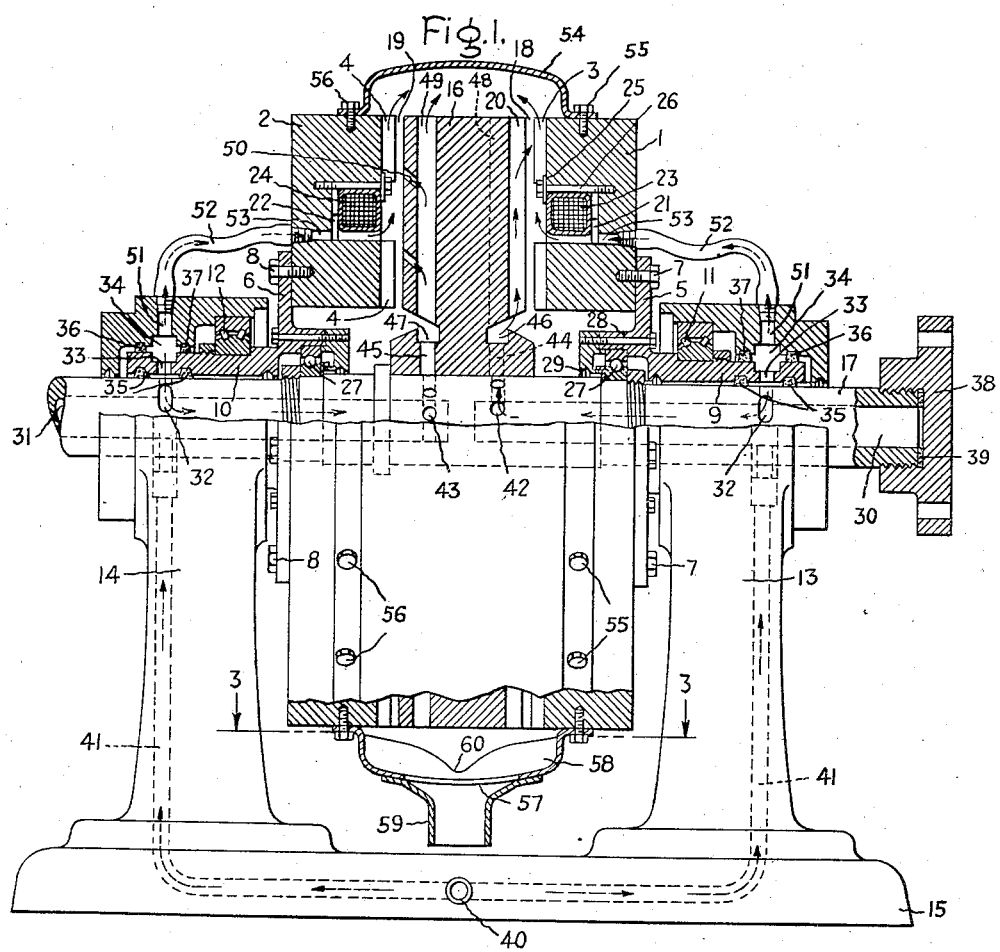
Inventor:
Adolph C. Hugin,
by Provell S. Mack
His Attorney.

Patented Nov. 9, 1948

2,453,509

UNITED STATES PATENT OFFICE 2,453,509

DYNAMOELECTRIC MACHINE

Adolph C. Hugin, Schenectady, N. Y., assignor to General Electric Company, a corporation of New York Application December 11, 1945, Serial No. 634,215

15 Claims. (Cl. 188—104)

My invention relates to dynamoelectric machines and particularly to eddy current inductor type machines which are adaptable for use as clutches, dynamometers, brakes, or similar equipment.

An object of my invention is to provide an improved dynamoelectric machine of the inductor type.

Another object of my invention is to provide an improved inductor dynamoelectric machine with an efficient cooling system.

Further objects and advantages of my invention will become apparent and my invention will be better understood from the following description referring to the accompanying drawing, and the features of novelty which characterize my invention will be pointed out with particularity in the claims annexed to and forming part of this specification.

Broadly the means employed in the embodiments herein illustrated and described comprises a dynamoelectric machine, particularly of the inductor eddy current type adapted to be used as a dynamometer or a brake, in which cooling fluid is supplied directly to passages within the rotatable member, and also to the recess in which the field exciting winding is arranged, and also in slots between teeth provided on one or more of the principal members of the machine. Thus cooling liquid is supplied directly in contact with material which is heated by eddy currents, and flows through and adjacent this material around the air gap surfaces of the members.

In the drawing, Fig. 1 is a side elevational view, partly in section, illustrating an embodiment of my invention; Fig. 2 is a partial side elevational view in section showing a modification of the construction shown in Fig. 1; and Fig. 3 is a sectional view taken along line 3—3 of Fig. 1.

Referring to the drawing, I have shown an embodiment of my improved inductor type dynamoelectric machine provided with a stationary member including a pair of axially spaced apart core members 1 and 2 made of magnetic material and formed with a plurality of radially outwardly extending teeth 3 and 4 in the inner radial faces thereof. In this type machine, it is desirable that the power which is to be absorbed by the machine if it is utilized as a brake or a dynamometer shall be generated as eddy currents in either the stationary or rotatable members of the machine and that the heat produced by these eddy currents be dissipated as quickly as possible to utilize the material in the machine most efficiently and to prevent overheating of the machine. These eddy currents may be generated in either one or both of the members, and in my improved construction, the eddy currents are adapted to be generated in both the rotatable and stationary members and, in addition, to be generated in the largest surfaces of both of these members, utilizing the material of these members to maximum capacity. In the construction shown in Fig. 1, the stationary member is arranged for limited rotary movement, so that the torque thereon due to the energy absorbed by the machine may be measured and the machine may be used as a dynamometer. This limited rotary movement of the stationary member is provided by supporting the stationary member cores 1 and 2 by end shield flanges 5 and 6 which are suitably secured to the cores 1 and 2 in any desired manner, as by bolts 7 and 8, and these end shields are formed with axially extending sleeves 9 and 10 rotatably supported by antifriction thrust bearings formed as roller bearings 11 and 12 mounted in pedestals 13 and 14 suitably secured to a base 15. The machine is provided with a rotatable member having a core 16 of magnetic material which is essentially a solid cylinder mounted on a supporting shaft 17 and arranged between the axially spaced apart core members 1 and 2 of the stationary member with the radial faces of the rotatable member core 16 adjacent the teeth 3 and 4 of the stationary member on each side thereof with air gaps 18 and 19 between the adjacent faces thereof. The radial faces of the rotatable member core 16 are formed with a plurality of radially outwardly extending slots 20 in each of the faces thereof which are fewer in number than the teeth in the stationary core members, such that the faces between these slots in the rotatable member will be considerably larger than the faces of the teeth 3 and 4 in order that the eddy currents generated in the rotatable member may be greater than the eddy currents generated in the faces of the stationary core member. Furthermore, the slots 20 in the faces of the rotatable member core 16 are staggered on opposite sides of this member so that they do not line up on a longitudinal center line as shown in this figure.

The power absorption capacity of the machine is dependent upon the relative rotation of the electrically conductive material which forms the stationary and rotatable member cores past the teeth in the two members or past the slots which form these teeth in the magnetic field of the machine so as to produce a variation in the magnetic field intensity cut by this electrically conductive material. In the illustrated construction, the stationary member cores 1 and 2 are formed with circularly extending winding recesses 21 and 22 in the inner radial faces thereof, and toroidal field exciting windings 23 and 24 are arranged in these recesses and secured in position by suitable clamps 25 held in position by bolts 26 in order to provide the desired magnetic excitation to the stationary and rotatable members for the generation of eddy currents in the adjacent radial faces thereof when the rotatable member core 16 is rotated. Antifriction bearings 27 are arranged in an axially extending sleeve 28 at each end of the machine for rotatably supporting the rotatable member on the stationary member end shield, and suitable labyrinth seals 29 are provided for preventing the entrance of cooling fluid into these bearings from the interior of the machine.

In order to remove the heat generated by the absorbed energy and to provide for cooling the machine, the shaft 17 is formed with axially extending passages 30 and 31 from adjacent each end of the shaft to adjacent the middle portion of the rotatable member core 16. If desired, this hollow shaft construction may extend only from one end of the shaft to a position longitudinally of the shaft corresponding to a portion which supports the core 16 of the rotatable member. A plurality of fluid supply openings formed as slots 32 extends inwardly through the shaft at each end thereof into communication with the axially extending shaft passages 30 and 31 to provide a communication between the interior of the shaft 17 and with passages 33 extending through the stationary member sleeves 9 and 10 and communicating with a cooling fluid supply header recess 34 formed in each of the pedestals 13 and 14 at each end of the machine. Suitable seals 35 are arranged between the stationary member sleeves 9 and 10 and the shaft 17 to prevent the passage of cooling fluid axially along the shaft in either direction over the outer surface thereof, and similar seals 36 and 37 are arranged to prevent the passage of cooling fluid from the cooling fluid header recess 34 in either direction axially along the outer surface of the sleeves 9 and 10 towards the ends of the shaft 17 and towards the bearings 11 and 12. The ends of the shaft 17 are closed by suitable coupling members 38 which are secured to the ends of the shaft 17 in any suitable manner, as by threaded engagement therewith, and a gasket 39 is arranged between the ends of the coupling members 38 and the end of the shaft to prevent the passage of cooling fluid to the threaded portion of the coupling member 38 on the shaft 17. This coupling member 38 is adapted to be connected to any suitable source of mechanical power for driving the rotatable member of the machine, and when this machine is placed in operation, the cooling fluid supply is turned on prior to the operation of the machine, such that cooling fluid may be supplied through a suitable supply pipe 40 into connecting pipes or passages 41 to each of the pedestal cooling fluid header recesses 34, from which it may pass into the axially extending shaft passages 30 and 31 and into a plurality of outwardly extending passages 42 and 43 through the shaft arranged in two circumferentially staggered sets in communication with outwardly extending passages 44 and 45 through the rotatable member. Since the radial length of the combined passages 44 and 42 and 45 and 43 is greater than the radial length of the inwardly extending shaft passages 32, there will be a tendency for the cooling fluid to be pumped outwardly into the machine by rotation of the rotatable member and to draw cooling liquid into the shaft through the passages 32. The cooling liquid will be exhausted under the action of centrifugal force from the rotatable member passages 44 and 45 into circumferentially extending recesses 46 and 47, from which it will pass into outwardly extending passages 48 and 49 extending through the rotatable member circumferentially spaced between the rotatable member slots 20. In addition, a plurality of outwardly extending passages 50 are formed through the rotatable member in communication with the outwardly extending passages 48 and 49 and open to the radial faces of the rotatable member, such that cooling fluid which is pumped into the rotatable member passages 48 and 49 will be forced outwardly into the air gap between the rotatable member and the stationary member and come into contact with the radial faces of the stator core teeth and with the radial faces of the rotatable member, thereby removing heat by direct contact with these faces in which the major portion of the eddy currents are generated. In addition, I provide outwardly extending passages 51 through the pedestals 13 and 14 and connect these by suitable flexible fluid conduits 52 to cooling fluid passages 53 which communicate with the field exciting winding recesses 21 and 22 to provide for the passage of cooling fluid around the field exciting windings 23 and 24 from which the cooling fluid passes serially into the air gap in contact with the radial faces of the cores of the stationary and rotatable members for further cooling these members. A housing 54 is arranged around the outer periphery of the rotatable member, and is secured in any suitable manner, as by bolts 55 and 56, to the stationary member cores 1 and 2 and is spaced radially from the outer periphery of the rotatable member core 16 and arranged in communication with the air gaps 18 and 19 of the machine for collecting the cooling fluid which is centrifugally exhausted from the machine and for draining this cooling fluid from the machine through a suitable drain passage 57 at the lower part of the machine housing 54 at a point lower than any of the eddy current surfaces of the cores of the stationary and rotatable members of the machine to prevent the accumulation of cooling fluid within the machine. In order to minimize rotation of cooling fluid around the machine in the space between the housing 54 and the outer surface of the rotatable member 16 a baffle 58 is secured in any suitable manner, as by welding, to the housing 54 over substantially the middle of the drain opening 57, such that cooling fluid from either side of the housing will impinge on the baffle 58 and be deflected out through the drain opening 57 and a drain connection 59 secured to the housing 54 over the opening 57. The baffle 58 may be made to extend toward the outer surface of the rotatable member 16 as far as may be found necessary to assure maximum removal of cooling fluid from the housing 54, and this may vary according to the size of the machine and the average operating speed for which it is designed. In addition, the baffle 58 is formed with a downwardly curved outer edge 60 which permits a certain amount of cooling fluid to spill over the top of the baffle to reduce the building up of pressure of fluid against the baffle 58. Such fluid passing over the baffle also drains out of the opening 57 and the funnel drain connection 59. With this construction, cooling fluid is adapted to be supplied through the shaft of the rotatable member and through passages in the rotatable member to provide for cooling the rotatable member by passage of the fluid through this member and also by passage of the cooling fluid from the rotatable member cooling passages into the air gap of the machine and into direct contact with the eddy current surfaces of both the rotatable and stationary members of the machine. The provision of slots in both the rotatable and stationary members of the machine provides for the utilization of the radial faces of both of these members as eddy current generating surfaces, and the contact of the cooling fluid with both of these surfaces provides for maximum utilization of the material in the machine.

A modification of the construction shown in Fig. 1 is illustrated in Fig. 2, in which the rotatable member core 16 is formed with outwardly extending passages 61 extending directly into communication with the outwardly extending passages 42 and 43 of the shaft 17. In this construction, the parts of the machine, such as the stationary member, pedestals, etc., which are not illustrated correspond to those in Fig. 1, and like reference numerals are applied to the illustrated parts which correspond to the elements shown in this figure. As shown, the outwardly extending passages 61 in the rotatable member core are arranged in communication with a plurality of outwardly extending passages 62, such that rotation of the rotatable member causes the cooling fluid, such as water, to be pumped through the axially extending shaft passages 30 and 31 and into the rotatable member core 16 and out through the core passages 61 and 62 into direct contact with the eddy current radial faces of the stationary member teeth and the rotatable member core, thereby effectively removing the heat generated in these surfaces by direct contact with the exteriors thereof and by passage of the cooling fluid through the rotatable member. In addition, some cooling fluid will pass from the air gap between the rotatable and stationary members and will enter the slots 20 in the rotatable member and the slots between the teeth 3 and 4 of the stationary member cores 1 and 2 and pass outwardly under the action of centrifugal force through these slots, thereby further cooling these parts of the machine. This construction is more simple than that in Fig. 1 and may be found to be more desirable in some instances.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine including a stationary member having a pair of core members of magnetic material anad having radial faces, a rotatable member having radial faces arranged between said stationary core members with an air gap between said stationary member and the adjacent rotatable member radial faces, one of said members being formed with a plurality of outwardly extending teeth in the radial faces thereof, means for magnetically exciting said stationary and rotatable members, outwardly extending passages through said rotatable member communicating with said air gaps and with the spaces between said teeth, and means including a hollow perforated shaft for supplying cooling fluid to said rotatable member passages and into said air gap in contact with said radial faces of said stationary and rotatable members for cooling said members by direct contact therewith and by passage through said rotatable member passages.

2. A dynamoelectric machine including a stationary member having a pair of axially spaced apart core members with radial faces and formed of magnetic material, a rotatable member having a core of magnetic material with radial faces arranged between said stationary core members, a plurality of outwardly extending teeth in the inner radial faces of one of said members, means including a field exciting winding for magnetically exciting said stationary and rotatable members, means for supporting said stationary member for limited rotary movement, means for rotatably supporting said rotatable member, outwardly extending passages through said rotatable member with communicating passages therefrom to the adjacent outer radial faces of said rotatable member, and means for supplying cooling fluid to said rotatable member passages and into contact with the faces of said rotatable and stationary members for cooling said members by direct contact therewith and by passage through said rotatable member passages.

3. A dynamoelectric machine including a stationary member having a pair of axially spaced apart core members of magnetic material formed with radial faces and a plurality of outwardly extending teeth in the inner radial faces thereof, a rotatable member having a core of magnetic material having radial faces arranged between said stationary core members, a plurality of outwardly extending slots in each of said rotatable member radial faces, means including a field exciting winding for magnetically exciting said stationary and rotatable members, means for rotatably supporting said stationary and rotatable members, outwardly extending passages through said rotatable member with communicating passages therefrom to the adjacent outer radial faces of said rotatable member, and means for supplying cooling fluid to said rotatable member passages and into contact with the faces of said rotatable and stationary members for cooling said members by direct contact therewith and by passage through said rotatable member passages and slots.

4. A dynamoelectric machine including a stationary member having a plurality of core members with radial faces and formed of magnetic material, a rotatable member with radial faces arranged between said stationary core members with an air gap between said stationary member and the adjacent rotatable member radial faces, one of said members being formed with a plurality of radially outwardly extending teeth in the radial faces thereof, means including a field exciting winding for magnetically exciting said stationary and rotatable members, outwardly extending passages through said rotatable member and communicating passages extending slantwise so as to be both radially and axially outward therefrom to the adjacent outer radial faces of said rotatable member, means for supplying cooling fluid to said rotatable member passages and into said air gap in contact with the faces of said stationary and rotatable members for cooling said members by direct contact therewith and by passage through said rotatable member passages, and means for collecting and draining the cooling fluid exhausted from said air gaps.

5. A dynamoelectric machine including a stationary member having a pair of core members of magnetic material and having radial faces, a rotatable member having radial faces arranged between said stationary core members with air gaps between said stationary member and the adjacent rotatable member radial faces, one of said members being formed with a plurality of outwardly extending teeth in the radial faces thereof, means for magnetically exciting said stationary and rotatable members, diagonal outwardly extending passages through said rotatable member communicating with said air gaps, means for supplying cooling fluid to said rotatable member passages and into said air gaps in contact with the faces of said stationary and rotatable members for cooling said members by direct contact therewith and by passage through said rotatable member passages, and means including a housing around said rotatable member and a transversely extending baffle in said housing arranged in the lower part thereof over a drain opening therethrough for collecting and draining cooling fluid from said machine.

6. A dynamoelectric machine including a stationary member having a pair of axially spaced apart core members with radial faces and formed of magnetic material formed with a plurality of outwardly extending teeth in the inner radial faces thereof, a rotatable member having a core of magnetic material with radial faces arranged between said stationary core members with an air gap between said stationary member teeth and each side of said rotatable member, means including a field exciting winding for magnetically exciting said stationary and rotatable members, means including a shaft for rotatably supporting said rotatable member, an axially extending passage through said shaft, means for supplying cooling fluid into said shaft passage, and means including diagonal outwardly extending passages through said rotatable member with communicating passages extending outwardly therefrom to the adjacent outer radial faces of said rotatable member and arranged in communication with said shaft passage for the passage of cooling fluid through said shaft passage to said rotatable member passages and into said air gap in contact with the faces of said rotatable and stationary members.

7. A dynamoelectric machine including a stationary member having a pair of axially spaced apart core members with radial faces and formed of magnetic material formed with a plurality of outwardly extending teeth in the inner radial faces thereof, a rotatable member having a core of magnetic material with radial faces arranged between said stationary core members with air gaps between said stationary core members and the adjacent rotatable member radial faces, means including a field exciting winding for magnetically exciting said stationary and rotatable members, means for supporting said stationary member for limited rotary movement, means for rotatably supporting said rotatable member, outwardly extending passages through said rotatable member with communicating passages therefrom to the adjacent outer radial faces of said rotatable member, means for supplying cooling fluid to said rotatable member passages and into said air gaps in contact with the faces of said rotatable and stationary core members for cooling said members by direct contact therewith and by passage through said rotatable member passages, and means including a housing secured to said stationary member and communicating with the air gaps between said rotatable member and said stationary core members for collecting and draining cooling fluid exhausted from said machine.

8. A dynamoelectric machine including a stationary member having a pair of core members with radial faces and formed of magnetic material formed with a plurality of radially outwardly extending teeth in the inner radial faces thereof, a rotatable member having a core of magnetic material with radial faces arranged between said stationary core members with an air gap between said stationary member and the adjacent rotatable member radial faces, means including a field exciting winding for magnetically exciting said stationary and rotatable members and generating eddy currents in the adjacent radial faces thereof, means for supporting said stationary member for limited rotary movement, means for rotatably supporting said rotatable member on said stationary member, means including outwardly extending passages through said rotatable member with communicating passages extending outwardly therefrom to the adjacent outer radial faces of said rotatable member, means for supplying cooling fluid to said rotatable member passages and into said air gap in contact with the faces of said stationary member teeth for cooling said rotatable and stationary members by direct contact therewith and by passage through said rotatable member passages, and means for collecting and draining the cooling fluid exhausted from said machine.

9. A dynamoelectric machine including a stationary member having a pair of axially spaced apart core members with radial faces and formed of magnetic material formed with a plurality of outwardly extending teeth in the inner radial faces thereof, a rotatable member having a core of magnetic material with radial faces arranged between said stationary members with an air gap between said stationary core members and the adjacent rotatable member radial faces, a plurality of outwardly extending slots in each of said rotatable member radial faces, means including a field exciting winding for magnetically exciting said stationary and rotatable members, means for supporting said stationary member for limited rotary movement, means for rotatably supporting said rotatable member, outwardly extending passages through said rotatable member with communicating passages therefrom to the adjacent outer radial faces of said rotatable member, means for supplying cooling fluid to said rotatable member passages and into said air gaps in contact with the faces of said rotatable and stationary members for cooling said members by direct contact therewith and by passage through said rotatable member passages and slots, and means including a housing secured to said stationary member and communicating with the air gaps between said rotatable member and said stationary core members for collecting and draining cooling fluid centrifugally exhausted from said machine.

10. A dynamoelectric machine including a stationary member having a pair of axially spaced apart core members with radial faces and formed of magnetic material formed with a plurality of radially outwardly extending teeth in the inner radial faces thereof, a rotatable member having a core of magnetic material with radial faces arranged between said stationary core members with an air gap between said stationary core members and the adjacent rotatable member faces, a plurality of radially outwardly extending slots in each of said rotatable member radial faces fewer in number than said teeth in said stationary core members, means including a field exciting winding for magnetically exciting said stationary and rotatable members and generating eddy currents in the adjacent radial faces thereof, a shaft for supporting said rotatable member, means for supporting said stationary member for limited rotary movement, means for rotatably supporting said rotatable member on said stationary member, axially extending passages through said shaft from adjacent each end of said shaft, means including outwardly extending passages through said rotatable member with communicating passages extending outwardly therefrom to the adjacent outer radial faces of said rotatable member and arranged in communication with said outwardly extending passages through said shaft, and means for supplying cooling fluid through said shaft passages to said rotatable member passages and into said air gap in contact with the faces of said stationary member teeth for cooling said rotatable and stationary members by direct contact therewith and by passage through said rotatable member passages and slots.

11. A dynamoelectric machine including a stationary member having a pair of axially spaced apart core members with radial faces and formed of magnetic material formed with a plurality of outwardly extending teeth in the inner radial faces thereof, a rotatable member having a core of magnetic material with radial faces arranged between said stationary core members with an air gap between said stationary member teeth on each side of said rotatable member and the adjacent rotatable member radial faces, a winding recess in each of said stationary core members, means including a field exciting winding in each of said recesses for magnetically exciting said stationary and rotatable members, a shaft for supporting said rotatable member, an axially extending passage through said shaft, means for supplying cooling fluid into said shaft passages, a plurality of outwardly extending passages through said shaft communicating with said axially extending passage in said shaft, means including outwardly extending passages through said rotatable member with communicating passages extending outwardly therefrom to the adjacent outer radial faces of said rotatable member and arranged in communication with said outwardly extending passages through said shaft for the passage of cooling fluid through said shaft passages to said rotatable member passages and into said air gaps in contact with the faces of said rotatable and stationary members, and means including a housing secured to said stationary member for collecting and draining cooling fluid exhausted from said machine.

12. A dynamoelectric machine including a stationary member having a pair of axially spaced apart core members with radial faces and formed of magnetic material formed with a plurality of outwardly extending teeth in the inner radial faces thereof, a rotatable member having a core of magnetic material with radial faces arranged between said stationary core members with an air gap between said stationary core members and the adjacent rotatable member radial faces, a plurality of outwardly extending slots in each of said rotatable member radial faces, a winding recess in each of said stationary core members, means including a field exciting winding in each of said recesses for magnetically exciting said stationary and rotatable members, a shaft for supporting said rotatable member, means for supporting said stationary member for limited rotary movement, means for rotatably supporting said rotatable member, an axially extending passage through said shaft, outwardly extending passages through said rotatable member with communicating passages therefrom to the adjacent outer radial faces of said rotatable member and arranged in communication with said passages through said shaft, means for supplying cooling fluid through said shaft passages to said rotatable member passages and into said air gaps into contact with the faces of said rotatable and stationary members for cooling said members by direct contact therewith and by passage through said rotatable member passages and slots, and means including a housing secured to said stationary member and communicating with the air gaps between said rotatable member and said stationary core members for collecting and draining cooling fluid exhausted from said machine.

13. A dynamoelectric machine including a stationary member having a pair of axially spaced apart core members with radial faces and formed of magnetic material formed with a plurality of radially outwardly extending teeth in the inner radial faces thereof, a rotatable member having a core of magnetic material with radial faces arranged between said stationary core members with an air gap between said stationary core members and the adjacent rotatable member radial faces, a plurality of radially outwardly extending slots in each of said rotatable member radial faces, a circularly extending winding recess in the inner radial faces of each of said stationary core members, means including a field exciting winding in each of said recesses for magnetically exciting said stationary and rotatable members and generating eddy currents in the adjacent radial faces thereof, a shaft for supporting said rotatable member, means for supporting said stationary member for limited rotary movement, means for rotatably supporting said rotatable member on said stationary member, axially extending passages through said shaft from adjacent each end of said shaft, outwardly extending passages through said rotatable member with communicating passages therefrom to the adjacent outer radial faces of said rotatable member and arranged in communication with said passages through said shaft, means for supplying cooling fluid through said shaft passages to said rotatable member passages and into said air gaps in contact with the faces of said stationary member teeth for cooling said rotatable and stationary members by direct contact therewith and by passage through said rotatable member passages and slots, and means including a housing secured to said stationary member and communicating with the air gaps between said rotatable member and said stationary core members for collecting and draining cooling fluid centrifugally exhausted from said machine.

14. A dynamoelectric machine including a stationary member having a pair of axially spaced apart core members with radial faces and formed of magnetic material formed with a plurality of radially outwardly extending teeth in the inner radial faces thereof, a rotatable member having a core of magnetic material with radial faces arranged between said stationary core members with an air gap between said stationary member teeth on each side of said rotatable member and the adjacent rotatable member radial faces, a plurality of radially outwardly extending slots in each of said rotatable member radial faces fewer in number than said teeth in said stationary core members and circumferentially staggered on opposite sides of said rotatable member, a circularly extending winding recess in the inner radial faces of each of said stationary core members, means including a toroidal field exciting winding in each of said recesses for magnetically exciting said stationary and rotatable members and generating eddy currents in the adjacent radial faces thereof, a shaft for supporting said rotatable member, means including pedestal bearings for supporting said stationary member for limited rotary movement, means for rotatably supporting said rotatable member on said stationary member, axially extending passages through said shaft from adjacent each end of said shaft, means including inwardly extending cooling fluid passages through said shaft communicating with said axially extending passages therethrough and with passages through said stationary member and a fluid supply header recess in each of said pedestal bearings for supplying cooling fluid into said shaft, a plurality of outwardly extending passages through said shaft in two circumferentially staggered sets, the passages of each set communicating with the axially extending passage in said shaft from each adjacent end of said shaft, means including outwardly extending passages through said rotatable member arranged between said slots with communicating passages extending outwardly therefrom to the adjacent outer radial faces of said rotatable member and arranged in communication with said outwardly extending passages through said shaft for the passage of cooling fluid through said shaft passages to said rotatable member passages and into said air gap in contact with the faces of said stationary member teeth for cooling said rotatable and stationary members by direct contact therewith and by passage through said rotatable member passages and slots, and means including a housing secured to said stationary member for collecting and draining cooling fluid exhausted from said machine.

15. A dynamoelectric machine including a stationary member having a pair of axially spaced apart core members with radial faces and formed of magnetic material formed with a plurality of radially outwardly extending teeth in the inner radial faces thereof, a rotatable member having a core of magnetic material with radial faces arranged between said stationary core members with an air gap between said stationary member teeth on each side of said rotatable member and the adjacent rotatable member radial faces, a plurality of radially outwardly extending slots in each of said rotatable member radial faces fewer in number than said teeth in said stationary core members, a circularly extending winding recess in the inner radial faces of each of said stationary core members, means including a toroidal field exciting winding in each of said recesses for magnetically exciting said stationary and rotatable members and generating eddy currents in the adjacent radial faces thereof, a shaft for supporting said rotatable member, means including pedestal bearings for supporting said stationary member for limited rotary movement, means including bearings for rotatably supporting said rotatable member on said stationary member, axially extending passages through said shaft from adjacent each end of said shaft to adjacent the middle of said rotatable member, means including inwardly extending cooling fluid passages through said shaft communicating with said axially extending passages therethrough and with passages through said stationary member and a fluid supply header recess in each of said pedestal bearings for supplying cooling fluid into said shaft, means for sealing against the passage of cooling fluid in either direction along the outer surface of said shaft from said cooling fluid passages therethrough, means for sealing against the passage of cooling fluid in either direction axially from said header recesses, a plurality of outwardly extending passages through said shaft in two circumferentially staggered sets, the passages of each set communicating with the axially extending passage in said shaft from each adjacent end of said shaft, means including outwardly extending passages through said rotatable member with communicating passages therefrom to the adjacent outer radial faces of said rotatable member and arranged in communication with said outwardly extending passages through said shaft for the passage of cooling fluid through said shaft passages to said rotatable member passages and into said air gap in contact with the faces of said stationary member teeth for cooling said rotatable and stationary members by direct contact therewith and by passage through said rotatable member passages and slots, means including a flexible fluid connection conduit for supplying cooling fluid from each of said pedestal bearing header recesses to each of said field exciting winding recesses for cooling said field exciting winding and serially passing into said air gaps into contact with the radial air gap faces of said stationary and rotatable member faces for cooling said faces, and means including a housing secured to said stationary member and communicating with the air gaps between said rotatable member and said stationary core members for collecting the cooling fluid centrifugally exhausted from said machine and for draining the cooling fluid from said machine.

ADOLPH C. HUGIN.

REFERENCES CITED

The following references are of record in the file of this patent:

UNITED STATES PATENTS

| Number | Name | Date |
|---|---|---|
| 2,349,921 | Wemp | May 30, 1944 |
| 2,355,484 | Teker | Aug. 8, 1944 |